United States Patent
Rossmann et al.

(10) Patent No.: US 7,251,585 B2
(45) Date of Patent: Jul. 31, 2007

(54) METHOD AND COMPUTER SYSTEM FOR FORMULATING POTENTIAL MEASURES FOR INCREASING THE RELIABILITY OF A TECHNICAL SYSTEM

(75) Inventors: Jürgen Rossmann, Gunzenhausen (DE); Christian-Marius Wegner, Ansbach (DE)

(73) Assignee: Siemens Aktiengesellschaft, Munich (DE)

( * ) Notice: Subject to any disclaimer, the term of this patent is extended or adjusted under 35 U.S.C. 154(b) by 68 days.

(21) Appl. No.: 11/176,453

(22) Filed: Jul. 7, 2005

(65) Prior Publication Data

US 2006/0293869 A1    Dec. 28, 2006

Related U.S. Application Data

(60) Provisional application No. 60/690,573, filed on Jun. 14, 2005.

(51) Int. Cl.
*G21C 17/00* (2006.01)
*G06F 11/30* (2006.01)

(52) U.S. Cl. .................................................. 702/184
(58) Field of Classification Search ................ 702/184
See application file for complete search history.

(56) References Cited

U.S. PATENT DOCUMENTS

2006/0241910 A1 * 10/2006 Petchenev et al. .......... 702/184

FOREIGN PATENT DOCUMENTS

| DE | 196 49 643 A1 | 6/1998 |
| EP | 0 446 066 A2 | 9/1991 |

* cited by examiner

*Primary Examiner*—John Barlow
*Assistant Examiner*—Cindy D. Khuu

(57) ABSTRACT

Method, computer system, and computer-readable media for formulating potential measures to increase the reliability of a technical system. The method allows at least one evaluation aid with predefined evaluation criteria, the evaluation criteria serving to evaluate measures of the technical system taking place in the context of predictive maintenance. A user, e.g. an auditor, is requested to specify an evaluation and a weighting respectively for each of the evaluation criteria. A weighted evaluation is determined from the evaluations and the weightings with the assistance of a predefined weighting rule. The weighted evaluation serves to identify a list of measures with the most important measures. The method allows an efficient evaluation of the maintenance measures practiced by a system operator and thus the formulation of potential measures for improving the reliability of the technical system.

19 Claims, 6 Drawing Sheets

FIG 7

| | Evaluation | Weighting % | Weighted evaluation |
|---|---|---|---|
| Evaluation group A | | | |
| Evaluation subgroup A1 | | | 40 |
| Evaluation criterion A1a | 4 | 100 | 100 |
| Evaluation criterion A1b | 4 | 20 | 20 |
| Evaluation criterion A1c | 5 | 80 | 0 |
| Evaluation subgroup A2 | | | 245 |
| Evaluation criterion A2a | 1 | 80 | 320 |
| Evaluation criterion A2b | 1 | 100 | 400 |
| Evaluation criterion A2c | 4 | 80 | 80 |
| Evaluation criterion A2d | 2 | 60 | 180 |
| Evaluation group B | | | |
| Evaluation subgroup B1 | | | 187 |
| Evaluation criterion B1a | 2 | 60 | 180 |
| Evaluation criterion B1b | 4 | 80 | 80 |
| Evaluation criterion B1c | 2 | 100 | 300 |

FIG 8

| Priority list | Weighted evaluation |
|---|---|
| Evaluation criterion A2b | 400 |
| Evaluation criterion A2a | 320 |
| Evaluation criterion B1c | 300 |

METHOD AND COMPUTER SYSTEM FOR FORMULATING POTENTIAL MEASURES FOR INCREASING THE RELIABILITY OF A TECHNICAL SYSTEM

CROSS REFERENCE TO RELATED APPLICATIONS

This application claims priority to the U.S. Provisional application No. 60/690,573, filed Jun. 14, 2005 and which is incorporated by reference herein in its entirety.

FIELD OF INVENTION

The invention relates to a method and a computer system for formulating potential measures for increasing the reliability of a technical system.

SUMMARY OF INVENTION

Technical systems increasingly represent complex systems with a plurality of technical devices, which interact with one another. In particular, industrial production systems such as systems for producing continuous sheets of goods such as textiles, plastic or metal films stand out as a result of particularly complex combinations of devices for energy distribution, devices for automation and drive systems.

The economic efficiency of these types of technical system and in particular industrial production systems is decisively influenced by their reliability. Technical failure in individual devices, systems or system components can result in failure of the entire system to the point of a complete system shutdown. This brings about losses in quality and/or quantity during production and can result in a complete loss of production for instance.

A high level of technical system reliability is thus extremely important for many system operators. The reliability of a system is hereby understood to include both a guarantee of the correct functionality of the system and also its timely availability.

Predictive maintenance strategies are increasingly used to ensure a high level of reliability in systems of this type, in other words maintenance measures are derived on the basis of the established system status. The most varied of concepts and methods have been developed for predictive maintenance, in particular methods for monitoring the status of machines and system components, with the assistance of which potential malfunctions or failures can be detected in good time. Examples here are visual inspections, vibration analyses, oil analyses or thermographic analyses.

Investment in predictive maintenance however often fails to achieve the desired improvement in the reliability of the system. At the same time it is difficult to identify and implement the correct measures in order to optimize predictive maintenance.

Procedures known to date for analyzing the measures implemented by a company in the context of predictive maintenance mostly only relate to the empirical experience of experts for individual subareas. As a rule system operators also attempt to solve problems by themselves appointing and coordinating experts for the individual subareas. This sometimes results in short-term improvements in the reliability of the system, but often lacks the desired sustainability of this improvement.

It is therefore the object of the present invention to specify a method and a computer system for implementing this method, which allow a comprehensive evaluation of the predictive maintenance measures practiced by a system operator, in particular in complex technical systems, so that potential improvement measures can be formulated for a sustainable increase in system reliability.

The object is achieved by the claims.

The method according to the invention provides for at least one evaluation aid with predefined evaluation criteria. The evaluation criteria serve to evaluate measures for the technical system taking place in the context of predictive maintenance. A user, e.g. a system auditor, is requested to specify an evaluation and a weighting for each of the evaluation criteria respectively. A weighted evaluation is determined from the evaluations and weightings with the assistance of a predetermined weighting rule and then output. A list of measures with the most important measures for increasing the reliability of the system can be detected in a simple manner on the basis of the weighted evaluations.

The method according to the invention provides for an evaluation of maintenance measures based on a question/answer system with the assistance of predefined evaluation criteria. The use of predefined, in particular non-sector-specific and non-system-specific evaluation criteria allows a complete, detailed and objective acquisition of possible deficits in predictive maintenance. The evaluation criteria can be present in the form of quality features for instance, the presence of which is queried in the technical system. This query can be carried out for example by an auditor in the context of interviews with the system operator and/or with system personnel. The evaluation can take place for example by allocating a numeric value from 1 to 5 (1=criteria is not fulfilled, 5=criteria is fulfilled without reservation).

An evaluation aid is provided for evaluation purposes, this being provided for example in the form of paper or electronic questionnaires. The evaluation aid allows the evaluation to be carried out in a controlled and thus structured manner. A user, e.g. the auditor and/or the persons questioned by the auditor can thus be directed and/or guided during the evaluation. Automated self-evaluation of a system operator is also possible here without further participants.

The allocation of weightings for the evaluation criteria allows system or sector-specific data to be considered during the individual evaluations. The weighting can also be effected for example by allocating a numeric value (e.g. 30%=not very important, 100%=very important).

The weighted evaluations determined with the assistance of predefined weighting rules are thus a gauge for the significance of a measure for the reliability of the system and for the evaluation of the quality and/or quantity of this measure by the user, e.g. the system auditor. Weighted evaluations allow important measures thus resulting in high sustainability to be distinguished from less significant and thus less sustainable measures. At the same time improvement potential can be derived from the weighted evaluations. The improvement potential obtained for the respective measures can be prioritized individually for the respective system with the assistance of the weighted evaluations. Improvement measures with particular urgency or significance for the system can thus be identified and prioritized.

The method according to the invention stands out due to its use of predefined evaluation criteria, the guiding of a user during the evaluation of the measures and the use of predefined weighting rules by a high level of systematics, efficiency, transparency, traceability and objectivity. A rapid and repeatable analysis and evaluation of the maintenance measures in a technical system can be carried out. In particular regular repetition of the method, e.g. at intervals of a year, enables improvements in the measures to be objectively evaluated and documented in the context of predictive maintenance, thus allowing the sustainability of the implemented measures to be verified.

A particularly rapid and reliable determination and output of the weighted evaluations is possible in that the user data is acquired in a computer system and the weighted evaluations are determined and output by the computer system.

According to a particularly advantageous embodiment of the invention, the evaluation aid is provided by the computer system. This allows low-cost maintenance and updating of the evaluation criteria.

At least some of the evaluation criteria are preferably provided to evaluate the maintenance strategy, the maintenance resources and processes and the maintenance controlling of the system.

The maintenance strategy includes aspects such as predefined maintenance targets, strategies for target achievement etc. The efficiency of the deployment of personnel and material resources (technical means among others) and the operational processes associated with these are acquired during the evaluation of maintenance resources and processes. Aspects relating to maintenance technology, in other words methods for monitoring the status of devices, systems and system components, data acquisition, data analysis and reporting inter alia are highlighted here. Maintenance controlling includes all measures for evaluating the selected strategies, the deployment of personnel and materials in terms of achieving previously established targets.

This embodiment of the invention is based on the knowledge that measures implemented to date to increase the reliability of a technical system were therefore essentially ineffective, because they were primarily formulated solely on the basis of technical considerations. The true causes of the inadequate reliability of a technical system often lie less in the field of technology, but are due to the absence or incorrectness of the strategy relating to predictive maintenance, inadequate solutions for predictive maintenance, inefficient processes, systems, tools, and methods as well as a lack of qualified personnel. Solutions to date therefore remain essentially ineffective. The partial failure of predictive maintenance programs can mostly be ascribed to an interaction between several of the above-mentioned reasons. The evaluation of these aspects allows interactions to be identified and thus sustainable improvement measures to be formulated.

Examples of these could be:

A selected maintenance strategy is correct, e.g. implementation of a vibration measurement, the measurement is also carried out and evaluated correctly, but a failure occurs all the same. The reason for this is that due to defective processes the proposed measures are not carried out at the right time.

A method for status detection establishes that errors occur repeatedly. The defective components are replaced. Defective processes, e.g. a failure to analyze the causes of the errors, mean that the causes of the repeated failure are not established and expensive maintenance is thus repeatedly carried out.

The evaluation system and transparency can be improved even further, particularly in complex systems and with a plurality of predefined evaluation criteria in that the evaluation criteria are assigned to predefined evaluation groups.

The evaluation groups can allow an organizational, functional and/or competency-based assignment of the evaluation criteria. According to a particularly advantageous embodiment of the invention, the predefined evaluation groups include at least the groups 'maintenance strategy', 'maintenance resources and processes' and 'maintenance controlling' of the technical system.

The results obtained are preferably verified in further method steps on the basis of a previously established number of key elements (i.e. particularly important sub-systems or components) of the system. This is effected in that at least one key element of the system is selected, at least one verification aid is provided to verify the result achieved using the at least one evaluation aid, and a verification of the result for the at least one selected key element takes place with the assistance of the verification aid.

The verification aid preferably contains at least some of the predefined evaluation criteria of the at least one evaluation aid. The measures which take place in the context of predictive maintenance for the at least one key element can then be evaluated with the assistance of at least some of the predefined evaluation criteria. A subsequent comparison of the evaluations obtained with the assistance of the evaluation aid with the evaluations obtained with the assistance of the verification aid for the selected key elements allows inconsistencies between the two results to be established and further analyses to be initiated.

Since an optimum solution always represents a compromise between an effective and an economically viable solution, methods for status monitoring implemented in the system with the assistance of the evaluation aid are preferably evaluated in terms of their deployment efficiency. The results can subsequently be verified in that the verification aid provides a list of questions for the methods implemented for status monitoring and the efficiency of the method for status monitoring is determined for the at least one selected key element with the assistance of the list of questions.

The following method steps can be implemented to determine the efficiency of the methods for status monitoring for the at least one selected key element:

Requesting the user to specify a value respectively for the respective criticality of the at least one selected key element for the system, the type of methods for status monitoring implemented for the respective key element and values for the respective effectiveness and economic viability of this method, Determining and outputting the respective efficiency of the implemented method, the efficiency being derived from the respective values for effectiveness and economic viability and the criticality of the key element with the assistance of a predefined rule.

A computer system according to the invention for formulating potential measures to increase the reliability of a technical system comprises:

a) storage means for storing
   predefined evaluation criteria, the evaluation criteria being suitable for evaluating measures of the technical system taking place in the context of predictive maintenance,
   an evaluation and a weighting of each evaluation criteria respectively
   weighting rules
b) input means for the user to input a value for the evaluation and weighting respectively
c) processor means for determining a weighted evaluation from the input values of the first evaluations and the weightings with the assistance of the weighting rules and d) output means for asking the user for an evaluation input and for outputting values of the weighted evaluations.

A data carrier is furthermore addressed in the context of the invention, in particular a portable data carrier such as a disk or a CD-ROM for example, which stores a computer program, the computer program being able to interact with an operating system of the computer system according to the computer system claims such that the computer system executes the method according to the method claims.

A data carrier is also addressed in the context of the invention, in particular a portable data carrier such as a disk or a CD-ROM for example, on which predefined evaluation criteria are stored, the evaluation criteria being suitable for evaluating measures of the technical system taking place in the context of predictive maintenance.

Further advantages and advantageous embodiments of the invention are described below with reference to exemplary embodiments in the figures.

BRIEF DESCRIPTION OF THE DRAWINGS

FIG. 7 shows an example of an electronic spreadsheet for the determination of weighted evaluations, and FIG. 8 shows an example of a priority list with the most important measures.

DETAILED DESCRIPTION OF INVENTION

Figure 1:
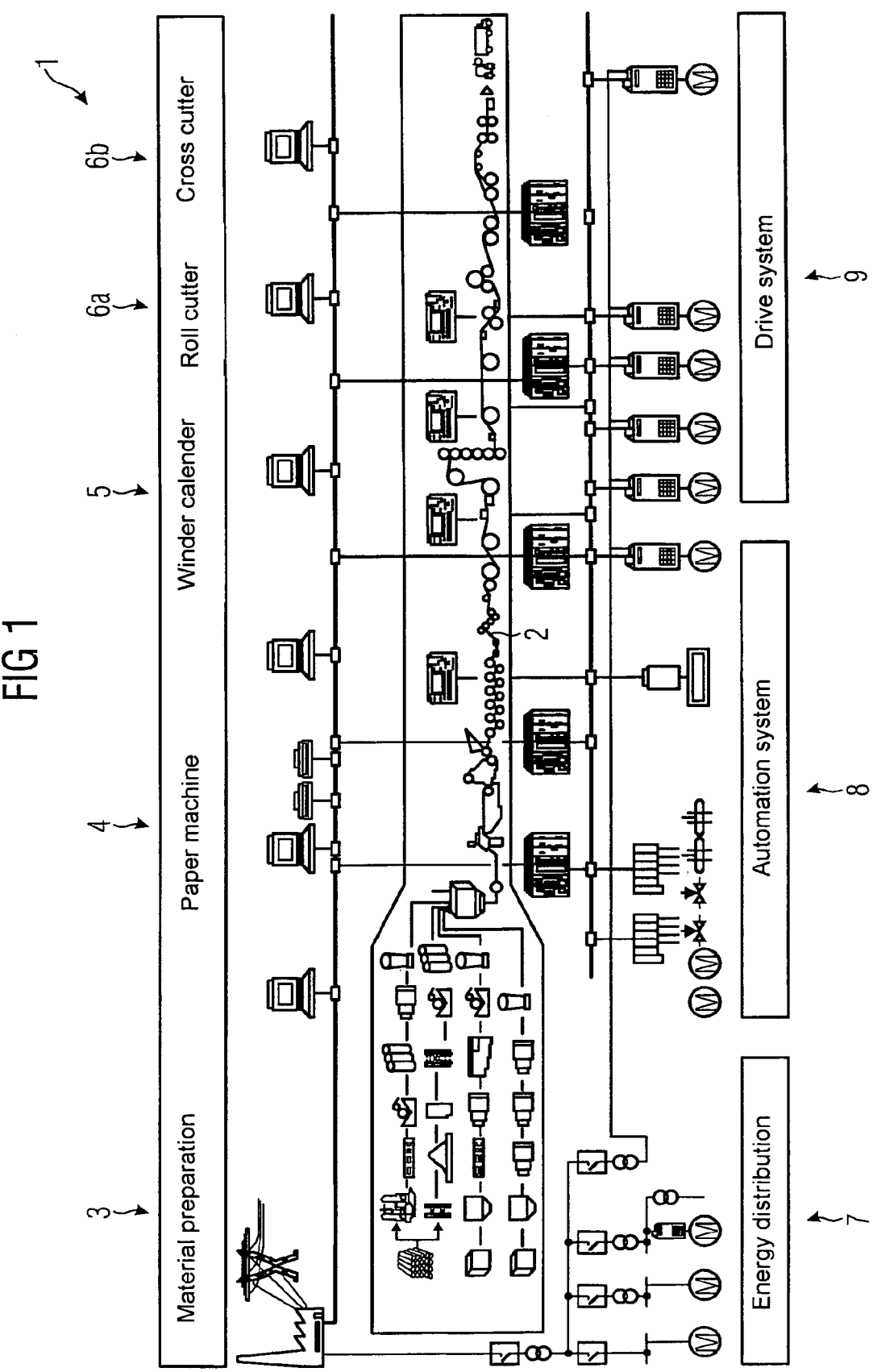
FIG. 1 shows a system for manufacturing paper in a simplified and schematic representation.

FIG. 1 shows a system 1 for manufacturing a continuous paper sheet 2. The system 1 comprises the system components material preparation 3, paper machine 4, winder/calender 5, roll cutter 6a, cross cutter 6b. All these system components contain energy distribution 7, automation system 8 and drive system 9 components. The system 1 thus represents a complex system of the most varied and interacting technical devices.

To guarantee the reliability of the system, e.g. to avoid problems from paper tears to complete system failure, the most varied measures are implemented in the context of predictive maintenance. These measures for example include vibration monitoring of stores, thermographic examination of distribution cabinets, recording and analysis of drive information etc.

Maintenance management is the responsibility of the system maintenance managers. In the context of a maintenance strategy, target specifications are predefined for the maintenance and reliability of the system. A maintenance controlling system is installed for maintenance control. A number of resources (in-house personnel, external personnel) are available to carry out maintenance.

Figure 2:
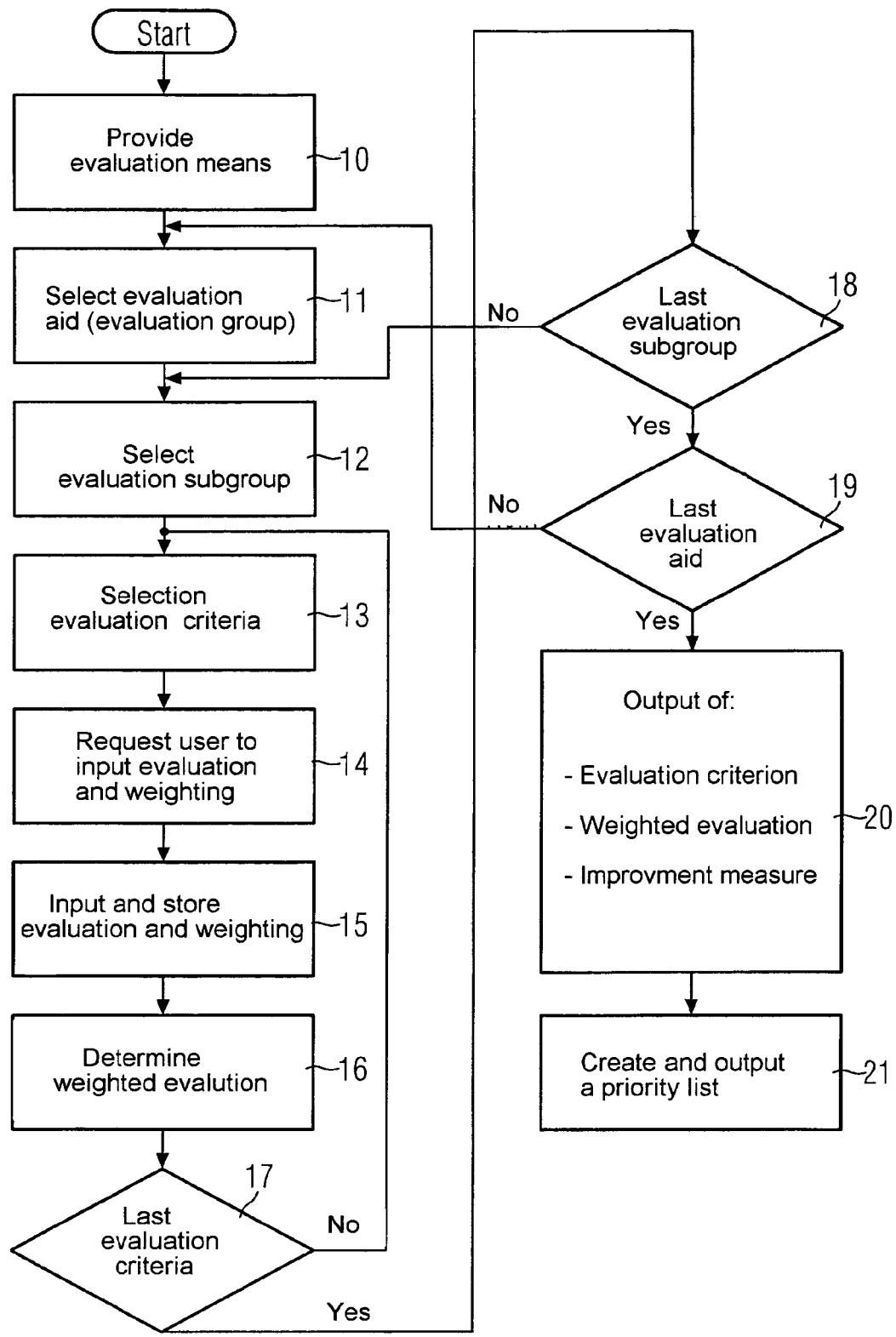
FIG. 2 shows a schematic flow diagram of an embodiment of the method according to the invention.

According to FIG. 2 in a first method step 10, evaluation aids with predefined evaluation criteria are provided to evaluate measures taking place in the system 1 in the context of predictive maintenance, in order to formulate potential measures to increase the reliability of the technical system 1.

The evaluation criteria are thereby allocated to the predefined evaluation groups maintenance strategy, maintenance resources and processes and maintenance controlling of the technical system. An evaluation aid is provided for each of the evaluation groups respectively.

To further improve the system, transparency and subtlety of the analysis the evaluation groups can in turn be subdivided into evaluation subgroups. By way of example, the evaluation group 'resources and processes' can in turn be subdivided into evaluation subgroups such as 'method' or 'in-house personnel/external personnel'. These subgroups can be subdivided further if necessary.

Generally all aspects are advantageously organized into a hierarchical structure. The predefined evaluation criteria to be evaluated individually during the course of the analysis are found on the lowest levels in each instance.

The evaluation criteria can be supplied in the form of (quality) features and/or lists of features, the presence of which is queried in the system.

Examples of evaluation criteria and/or features of the evaluation group and/or the evaluation aid 'maintenance strategy' could be:
  A process analysis was carried out and the results are documented in the form of function blocks
  Specific and measurable results are determined for reliability projects In an evaluation subgroup 'method' the evaluation criteria and/or features of the evaluation group 'resources and processes' could relate to methods for status monitoring for example:
  The selection, number, position and implementation of the measurement points are correct, in other words it is ensured that the measurements provide maximum information and there is maximum acquisition efficiency.
  The selection of the measurement intervals is correct, in other words they are tailored to the possible development of damage in respect of speed, and as a rule ensure a satisfactorily long lead time.

Examples of evaluation criteria and/or features of the evaluation group 'resources and processes', evaluation subgroup, 'in-house personnel, external personnel' could be:
  Dedicated work place descriptions exist for key tasks, e.g. analysis and evaluation of status data, reliability engineering, RCM specialist.
  Selection criteria exist for appointing subcontractors (UAN), several UANs were selected before one was appointed.

Examples of evaluation criteria and/or features of the evaluation groups 'maintenance controlling' could be:
  The established parameters are derived continuously and interpreted in terms of the effectiveness of the predictive maintenance
  The costs of predictive maintenance are systematically recorded and analyzed.

According to a particularly advantageous embodiment of the invention, the evaluation aids are supplied by a globally active system service provider. All knowledge acquired globally in a plurality of systems in conjunction with measures for guaranteeing and/or increasing the reliability of systems can thus be taken into account in the evaluation criteria, thereby allowing a particularly high level of objectivity and subtlety of analysis.

In a method step 11, an auditor for example selects a first of the evaluation aids and/or an evaluation group and in a method step 12 an evaluation subgroup of this selected evaluation aid is in turn selected. In a method step 13 an evaluation criterion of this evaluation subgroup is selected, and in a method step 14, the auditor is requested to input an evaluation and weighting for this evaluation criterion. Each criterion is evaluated based on a predefined rule. The evaluation takes place by interrogating the system operator with regard to fulfillment of the evaluation criteria, e.g. the presence of (quality) features.

The numeric values can be allocated according to the following requirements for instance:

Numeric value=1: The feature is basically not fulfilled

Numeric value=2: The feature is only fulfilled in places, in a few subareas

Numeric value=3: Fulfillment of the feature has considerable shortfalls

Numeric value=4: The feature is generally fulfilled. There are only deviations in some places.

Numeric value=5: The feature is fulfilled without reservation. There are no deviations. The occurrence of deviations is noted. The feature is fulfilled equally in all relevant areas.

In addition, each criterion is individually weighted by the auditor, e.g. 100%—the criterion has maximum relevance for the present system or 30%—the criterion plays rather a subordinate role.

In a method step 15, the inputting and storage of the evaluation and weighting takes place in a computer system.

In a method step 16, a weighted evaluation is automatically determined and output by the computer system from the evaluation and the weighting with the assistance of a predefined weighting rule.

A weighted evaluation, from which the potential for improvement measures can also be derived, can for example be determined by establishing the deviation for the evaluation from a maximum evaluation and multiplying this deviation by the weighting.

In the case of the above-mentioned numeric value allocation, the following weighting rule results:

Weighted evaluation (potential)=(maximum numeric value−achieved numeric value)×weighting.

The higher the weighted evaluation thereby achieved, the larger the potential for achieving a sustainable increase in the reliability of the technical system with suitable improvement measures. As a basic principle other evaluation schema and weighting rules are also possible.

A comparison of the weighted evaluations or potentials can be used to prioritize the measures which are of particularly high significance for the reliability of the system.

In a method step 17 it is verified whether this is the last evaluation criterion of the evaluation subgroup. If this is not the case, a return is made to method step 13, the selection of a further evaluation criteria of the evaluation subgroup and subsequent passage through the method steps 14-16 for this evaluation criterion.

In a method step 18 it is verified whether this is the last evaluation subgroup. If this is not the case, a return is made to method step 12, the selection of a further evaluation group and subsequent passage through the method steps 13 to 17 for this evaluation subgroup.

After determining the weighted evaluation of all evaluation subgroups of an evaluation aid, in a method step 19 it is verified whether the last evaluation aid is present. If this is not the case, an evaluation of the evaluation criteria of this and/or subsequently further evaluation aids can take place, by means of a return to the method step 11 (selection of a further evaluation aid) and passage through method steps 12-18. After passing through the last evaluation aid as well, the evaluation criteria and their weighted evaluations are output in a method step 20. If the weighted evaluation is below a predefined limit value, already predefined improvement measures can also be output.

The weighted evaluation can be used to identify in a simple manner which measures are potentially important for increasing the reliability of the technical system. In the case of the above-mentioned evaluations from 1 to 5 and weightings from 0 to 100% and the above-mentioned weighting rule, measures with a weighted evaluation of 500 exhibit a particularly high potential and measures with a weighted evaluation of 100 only exhibit a small potential for increasing the reliability of the system.

The weighted evaluations can also be used to create and output a priority list in a method step 21. The most important measures can thereby be identified in a cost-effective manner even with a high number of evaluation criteria, evaluation groups and evaluation subgroups.

The evaluation aids can be present for example in paper form in the form of a list of questions. The evaluation aids are preferably provided by a computer system, as described in relation to FIG. 4. The user and their entries can thereby be automatically guided and the weighted evaluations automatically determined, if necessary further processed and output on a suitable output means in a user-friendly and graphically attractive manner. A particularly structured, objective and efficient process is hereby possible and the storage of data and the determination of the results are reliably guaranteed.

Since the efficiency of the deployment of the method for status monitoring plays a central role in the predictive maintenance of a system, an evaluation of the methods for status monitoring in terms of the efficiency of their deployment is preferably carried out with the assistance of the evaluation aid. The results obtained in the method steps 10 to 21 are therefore advantageously verified according to FIG. 3 in further method steps by verifying the efficiency of deployment for a previously selected number of key elements of the system with the assistance of a verification aid.

To this end, in a method step 31 a verification aid is provided with a list of questions on the method to be implemented for status monitoring and the efficiency of the methods for status monitoring is determined for the at least one selected key element with the assistance of the list of questions. The verification aid is preferably also provided by the computer system.

A number of key elements of the system are selected in a method step 32, on the basis of which the efficiency of the methods for status monitoring is to be monitored.

In a method step 33 the user is requested with the assistance of the verification aid for a first of the selected key elements to specify a numeric value for the criticality of the key element for the system, to specify the methods for status monitoring implemented for this key element and numeric values for the effectiveness and economic viability of these methods. Subsequent to data inputting and storage in method step 34, in method step 35 the efficiency of the implemented methods is determined and then output automatically by the computer system with the assistance of a predefined rule from the numeric values for the effectiveness and economic viability of the respective methods as well as the criticality of the key element. The efficiency thus determined can now be compared with the evaluation of the deployment efficiency determined with the assistance of the evaluation aid and further analyses can be initiated in the event of inconsistencies.

In method step 36 it is verified whether the efficiency is below a predefined limit value. If it is below this limit value, a predefined improvement measure is output in a method step 37.

The method steps 33 to 36 and if necessary 37 are passed through for all key elements selected in method step 32.

The verification aids can be present in paper form or in electronic form, e.g. in the form of a list of questions, in a similar manner to the evaluation aid. The verification aids are also preferably provided by the computer system.

Figure 4:
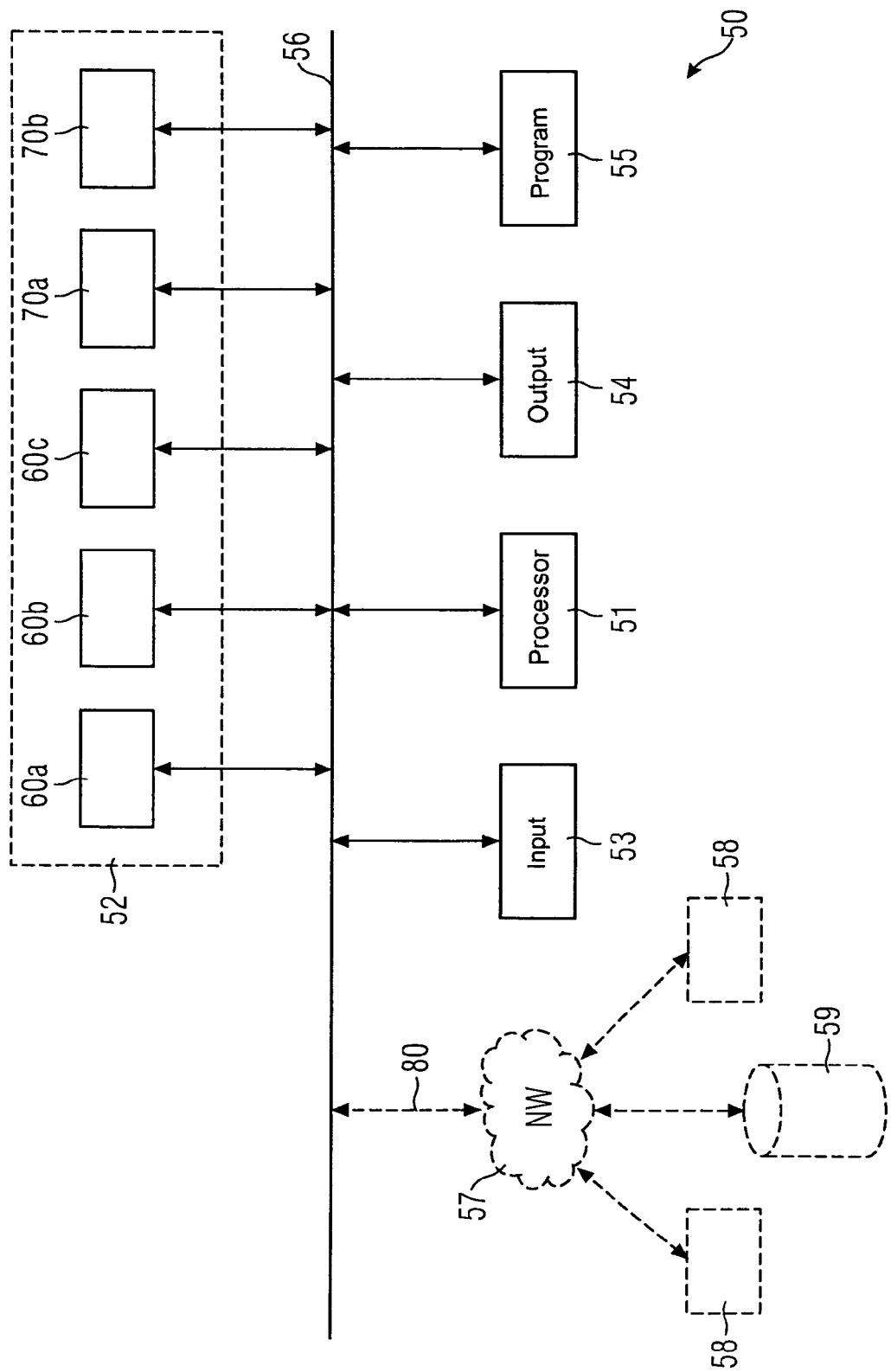
FIG. 4 shows a computer system according to the invention.

FIG. 4 shows an exemplary embodiment of a computer system 50 according to the invention. The computer system 50 comprises storage means 52 for storing predefined evaluation criteria, an evaluation and a weighting respectively for each evaluation criterion, and weighting rules.

To this end the storage means 52 comprise a number of evaluation data sets 60a to 60c, each of which is assigned to predefined evaluation groups, and each of the evaluation criteria is assigned respectively to one of these data sets. The data set 60a is used to evaluate the maintenance strategy, the data set 60b to evaluate the maintenance resources and processes and the data set 60c to evaluate the maintenance controlling.

Figure 5:
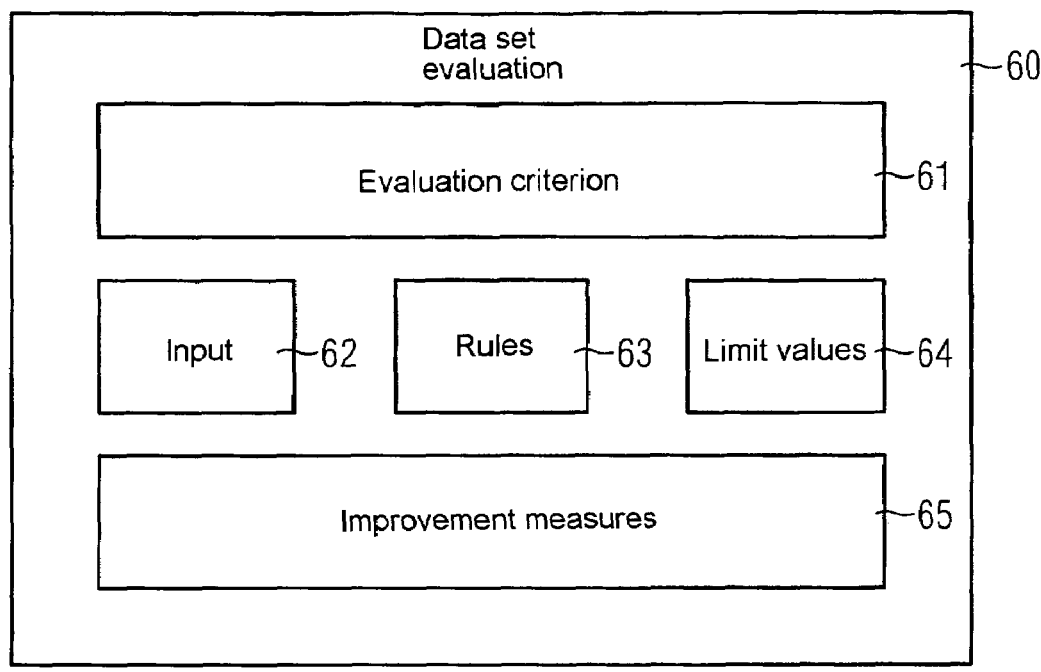
FIG. 5 shows an evaluation data set according to a preferred embodiment of the invention.

According to FIG. 5 each of the evaluation data sets 60a to 60c comprises the evaluation criteria 61 assigned to the respective evaluation groups, entries 62 of values for evaluations and weightings, weighting rules 63, limit values 64 for weighted evaluations and predefined improvement measures 65.

The computer system 50 further comprises input means 53 for the user, e.g. an auditor or one of the system operators, to input a value for the evaluation and weighting respectively. Furthermore processor means 51 are provided for determining a weighted evaluation from the input values for the evaluations and the weightings with the assistance of the weighting rules. A request can be made to the user to input an evaluation and to output values for the weighted evaluations by means of output means 54.

A corresponding control by means of a program allows the computer system to implement the method shown in FIG. 2 in an automated manner. The program can be stored in means 55 for program control and can interact with the processor means 51 via a bus 56. The means 60a to 60c and 51,53 and 54 can also communicate with one another via the bus 56.

In addition the evaluating criteria, rules, limit values and improvement measures stored in the storage means 52 can be maintained and updated via a communication connection 80 and a network 57, such as the internet.

The computer system 50 can be configured for example as a portable computer or notebook and can thus be used on site in a system for implementing the method according to FIG. 2. If the method is implemented on the premises of a system operator by a system service provider, in particular a globally active system service provider, all the globally acquired experience can be collected in a central database 59 to evaluate measures of a technical system taking place in the context of predictive maintenance and service provision units operating locally on site can be made available via the network 57.

Data can also be input and/or output via a data communication connection 80 and the network 57 (e.g. the internet and or intranet) on input and/or output means of remote computer systems 58 (not shown in more detail) instead of via the input means 53 and/or output means 54. The computer system 50 can thus be connected in a communicative manner to other computer systems 58 for data input and data output purposes via the network 57, e.g. the internet. The computer system 50 hereby functions as a server, which is operated for example by a system service provider and can access technical system operators to evaluate their measures in the context of predictive maintenance and to formulate potential measures to increase the reliability of the system via the network 77 with their computers 58 acting as 'clients'. The corresponding guidance of a user by the program control means 55 in this manner allows automated self evaluation of a system operator in respect of their measures taking place in the context of their predictive maintenance.

Figure 3:
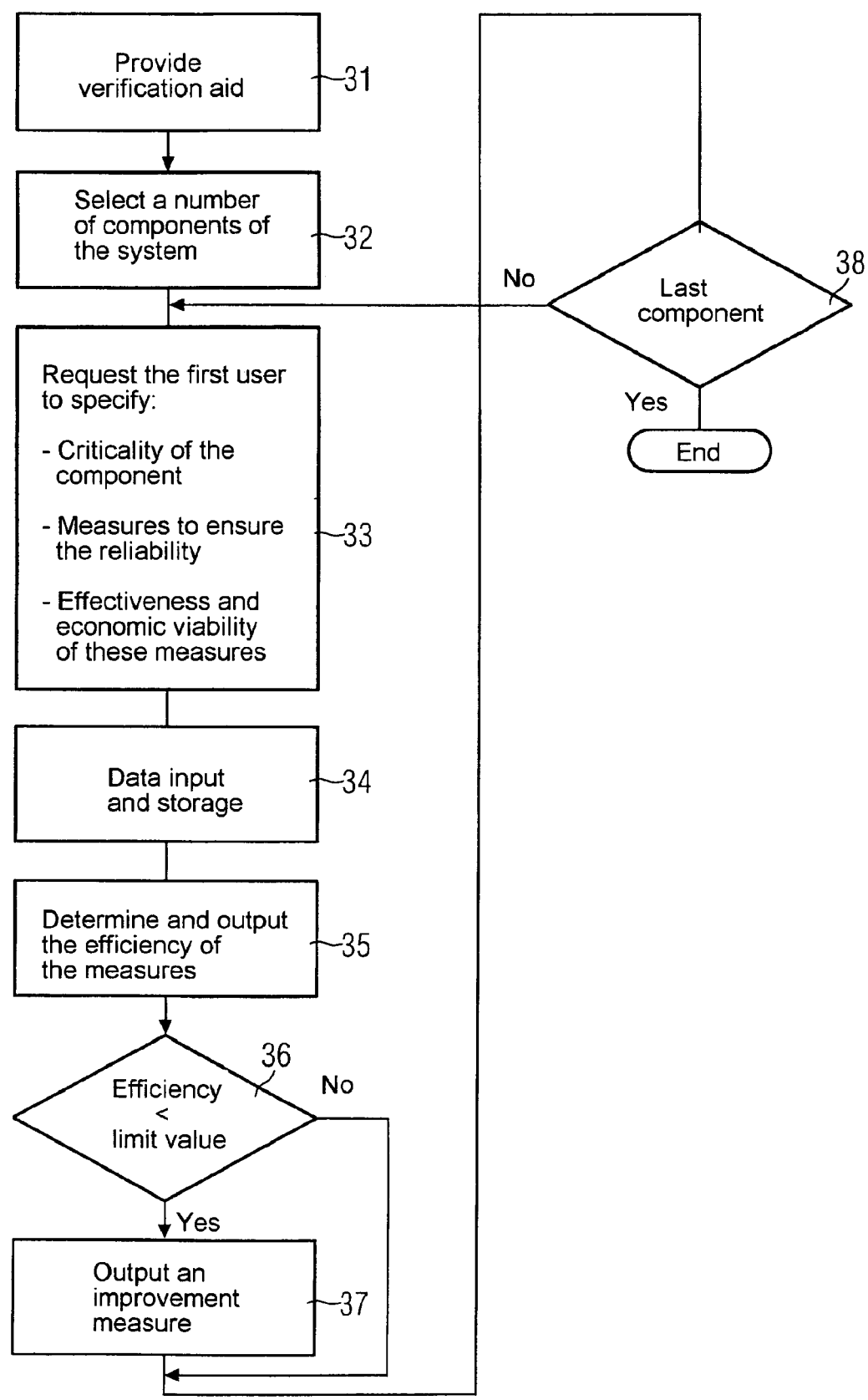
FIG. 3 shows a schematic flow diagram of a subsequent method for verifying the formulated results.
Figure 6:
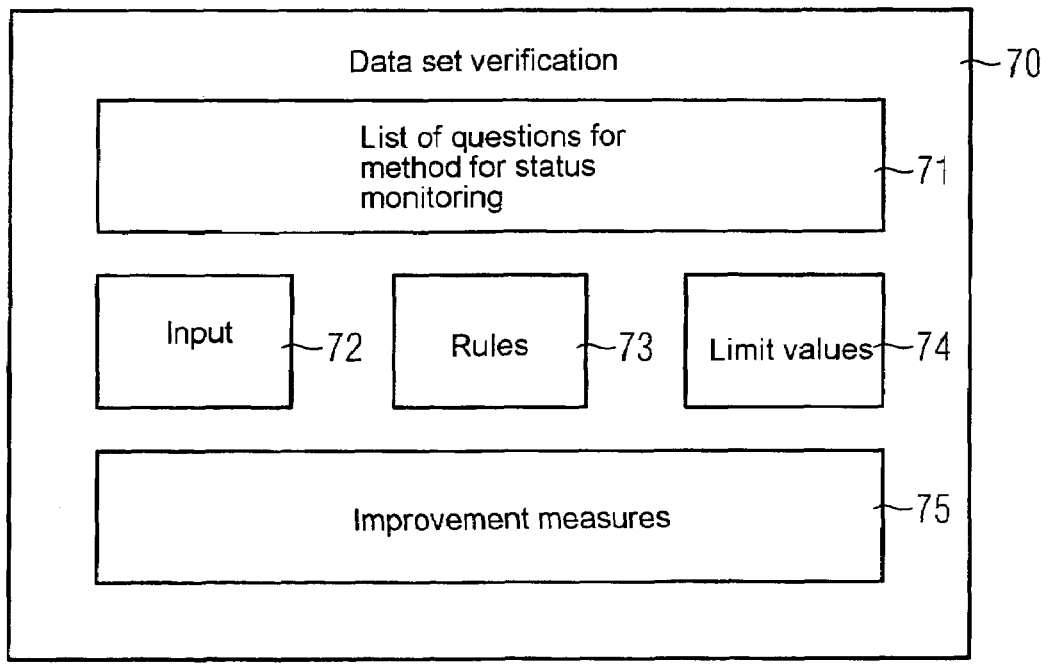
FIG. 6 shows a verification data set according to a preferred embodiment of the invention.

To implement the additional method steps for verifying the measures obtained according to FIG. 3, the computer system 50 advantageously has the following additional features.

a) the storage means 52 are additionally set up for the storage of a1) for a predefinable number of key elements of the system in each instance
    the criticality of the key element in the system
    the type of method for status monitoring implemented for this key element and the respective effectiveness and economic viability of said method a2) a rule for determining the efficiency of the methods for status monitoring implemented for a key element from the respective effectiveness and economic viability of the method as well as the criticality of the key element b) the input means 53 are additionally set up to input values for the criticality of a key element in the system and the effectiveness and economic viability of the methods for status monitoring implemented.

c) the processor means 51 are additionally set up to determine the respective efficiency of the method from the respectively input values for effectiveness and economic viability and the criticality of the key element with the assistance of the rule for determining the efficiency d) the output means 54 are additionally set up to request a user to input the values for the criticality of the key element, the effectiveness and economic viability of the method for status monitoring as well as to output the values for the efficiency of the method The storage means 52 for systematic verification of the measures obtained for each of the predefinable key elements each preferably comprise a verification dataset 70 according to FIG. 6, to which the values for the effectiveness and economic viability of the methods for status monitoring implemented with the key element and the value for the criticality of the key element are assigned.

In addition to list of questions 71 on the methods implemented for status monitoring, the data set 70 thus comprises data on entries 72 relating to the type of measures implemented for status monitoring and values for the criticality of the key element and the effectiveness and economic viability of the implemented measures. Furthermore the verification data set 70 can comprise rules 73 to determine the efficiency of a measure, limit values 74 for the efficiency and predefined improvement measures 75. In the computer system 50 in FIG. 4, verification is provided on the basis of two key elements and the storage means 52 therefore have two verification data sets 70a, 70b.

For user-friendly data input and output and result evaluation, the stored evaluation data sets and verification data sets can be acquired and/or output in one or several electronic spreadsheets. An electronic spread sheet is preferably provided for each of the data sets respectively. The electronic spreadsheets can be provided by a spreadsheet program such as Microsoft Excel 97 from the Microsoft Corporation. They can then be configured in the form of one or several spreadsheets of the spreadsheet program.

FIG. 7 shows an example of an electronic spreadsheet with predefined evaluation criteria generated with the assistance of a spreadsheet program, an evaluation and a weighting respectively being input for evaluation criteria of an evaluation group A with two evaluation subgroups A1 and A2 as well as evaluation criteria of an evaluation group B with one evaluation subgroup B1 and a weighted evaluation being determined and from these values for each of the evaluation criteria then output. By way of example, the previously described weighting rule was used, as were evaluations from 1 to 5 and weightings from 0 to 100%. A weighted evaluation can additionally be determined and output for an evaluation subgroup by taking the arithmetic mean of the weighted evaluations of the evaluation criteria of an evaluation subgroup. The weighted evaluations are used to provide a list of measures for increasing the reliability of the technical system in a simple manner. Specifically, the evaluation criterion A2$b$ has a very highly weighted evaluation of 400, thus a very high potential for improvement measures and thus a particularly high need for action. Evaluation criteria with highly weighted evaluations can be shown in a priority list according to FIG. 8.

The processor means 51 can be generated as discrete electronic components or by corresponding programming. A computer program can be stored in the program control means 55 and can interact with an operating system of the computer system 50 such that the computer system 50 executes the method according to the invention.

The evaluation criteria stored in the storage means 52 can be stored on a data carrier, in particular a portable data carrier, such as a disk or a CD-ROM, and can be made available to the computer system 50 for example by downloading to the storage means 52. The weighting rules, the predefined improvement measures, the data on measures for status monitoring for key elements of a technical system, etc, and information about the nature and manner of the display of data on the output means 54 can also be stored on the disk or CD-ROM.

The invention also comprises following advantageous embodiments:

A computer system, in which predefined evaluation groups comprise at least the groups maintenance strategy, maintenance resources and processes and maintenance controlling of the technical system.

A computer system, in which the storage means for each of the predefinable key elements respectively comprise a verification data set, to which the value for the criticality of the key element and the value for the effectiveness and economic viability of the method for status monitoring implemented for the key element are assigned.

A computer system, in which the system can be connected to a knowledge database.

A computer system, in which the computer system for data input and data output can be connected to other computer systems in a communicative manner via a network, in particular the Internet.

A data carrier, in particular a portable data carrier, e.g. a disk or a CD-ROM, which stores a computer program, the computer program being able to interact with an operating system of the inventive computer system such that the computer system executes the inventive method.

A data carrier, in particular a portable data carrier, e.g. a disk or a CD-ROM, on which predefined evaluation criteria are stored, the evaluation criteria being suitable for evaluating measures of the technical system taking place in the context of predictive maintenance.

The invention claimed is:

1. A method for formulating potential measures for increasing the reliability of a technical system, the method comprising the following steps:

providing at least one evaluation aid with predefined evaluation criteria, wherein the evaluation criteria serve to evaluate measures of the technical system taking place in the context of predictive maintenance;

requesting a user to specify an evaluation and a weighting respectively for each of the evaluation criteria, wherein the evaluation criteria are assigned to predefined evaluation groups; and determining and outputting a weighted evaluation from the evaluations and the weightings with the assistance of a predefined weighting rule to identify a list of measures with the most important measures, and further wherein the evaluation criteria are assigned respectively to evaluation subgroups and a weighted evaluation of the associated evaluation subgroup is determined from the evaluations and weightings of individual evaluation criteria of an evaluation subgroup.

2. The method according to claim 1, wherein the specifications of the user are acquired in a computer system and the weighted evaluations are determined and output by the computer system.

3. The method according to claim 2, wherein the at least one evaluation aid is provided by the computer system.

4. The method according to claim 1, wherein at least some of the evaluation criteria are provided to evaluate the maintenance strategy, the maintenance resources, the maintenance processes, and the maintenance controlling of the technical system.

5. The method according to claim 1, wherein the predefined evaluation groups comprise at least the groups maintenance strategy, maintenance resources, maintenance processes, and maintenance controlling of the technical system.

6. The method according to claim 1, wherein an improvement potential can be derived from the weighted evaluation.

7. The method according to claim 1, wherein a predefined improvement measure is output if the weighted evaluation is below a predefined limit value.

8. The method according to claim 1, wherein a priority list is generated for improvement measures to identify the list of measures based on the weighted evaluation.

9. The method according to claim 1, wherein an evaluation aid is provided for each of the evaluation groups.

10. A method for formulating potential measures for increasing the reliability of a technical system, the method comprising the following steps:

providing at least one evaluation aid with predefined evaluation criteria, wherein the evaluation criteria serve to evaluate measures of the technical system taking place in the context of predictive maintenance;

requesting a user to specify an evaluation and a weighting respectively for each of the evaluation criteria;

determining and outputting a weighted evaluation from the evaluations and the weightings with the assistance of a predefined weighting rule to identify a list of measures with the most important measures;

selecting at least one key element or key maintenance group of the system;

providing at least one verification aid to verify the results obtained with the at least one evaluation aid; and verifying the result for the at least one selected key element or key maintenance group using the verification aid.

11. The method according to claim 10, wherein
the verification aid contains at least some of the predefined evaluation criteria of the at least one evaluation means, wherein
the measures, which take place for the at least one key element or key maintenance group in the context of predictive maintenance, are evaluated with the assistance of at least some of the predefined evaluation criteria, and wherein
the evaluations obtained with the assistance of the evaluation aid are compared with the evaluations obtained with the assistance of the verification aid.

12. The method according to claim 10, wherein
an efficiency evaluation of methods implemented in the system for status monitoring takes place with the assistance of the evaluation aid, wherein
the verification aid provides a list of questions on methods for status monitoring, and wherein
the efficiency of the methods for status monitoring is determined for the at least one selected key element or key maintenance group with the assistance of the list of questions.

13. The method according to claim 12, wherein the following method steps are performed to determine the efficiency of the methods for status monitoring for the at least one selected key element or key maintenance group:
requesting the user to specify one value each for the respective criticality of the at least one selected key element or key maintenance group for the system, the type of methods for status monitoring implemented for the respective element or maintenance group and values for the respective effectiveness and economic viability of these methods; and
determining and outputting the respective efficiency of the implemented method, the efficiency being derived from the respective values for the effectiveness and economic viability and the criticality of the key element with the assistance of a predefined rule.

14. The method according to claim 13, wherein a predefined improvement measure is additionally output if the efficiency is below a predefined limit value.

15. A computer system for formulating potential measures to increase the reliability of a technical system, the computer system comprising:
storage mechanisms for storing predefined evaluation criteria, the evaluation criteria being suitable for evaluating measures of the technical system taking place in the context of predictive maintenance, for storing an evaluation and a weighting respectively for each evaluation criterion, and for storing weighting rules;
input mechanisms for entering a value for evaluation and weighting respectively by a user;
processing mechanisms for determining a weighted evaluation from the input values of the evaluations and the weightings with the assistance of the weighting rules; and
output mechanisms for requesting the user to enter an evaluation and to output values for the weighted evaluations, wherein
a) the storage mechanisms are set up for the storage of:
a1) for a predefinable number of key elements of the system in each instance:
the criticality of the key element in the system, and
the type of methods for status monitoring implemented for this key element and the respective effectiveness and economic viability of said methods, and
a2) a rule for determining the efficiency of the method for status monitoring implemented for a key element from the respective effectiveness and economic viability of the method as well as the criticality of the key element;
b) the input mechanisms are set up to input values for the criticality of a key element in the system and the effectiveness and economic viability of the methods implemented for status monitoring;
c) the processing mechanisms are set up to determine the respective efficiency of the method from the respectively input values for the effectiveness and economic viability and the criticality of the key element with the assistance of the rule for determining the efficiency; and
d) the output mechanisms are set up to request a user to input the values for the criticality of the key element, the effectiveness and economic viability of the method for status monitoring as well as to output the values for the efficiency of the method.

16. The Computer system according to claim 15, wherein the storage mechanisms comprise a number of evaluation data sets, assigned respectively to predefined evaluation groups, each of the evaluation criteria being assigned respectively to one of these data sets.

17. Computer readable media, which stores a computer program, the computer program being able to interact with an operating system of a computer system for a formulating potential measures to increase the reliability of a technical system, the computer system comprising:
storage mechanisms for storing predefined evaluation criteria, the evaluation criteria being suitable for evaluating measures of the technical system taking place in the context of predictive maintenance, for storing an evaluation and a weighting respectively for each evaluation criterion, and for storing weighting rules;
input mechanisms for entering a value for evaluation and weighting respectively by a user;
processing mechanisms for determining a weighted evaluation from the input values of the evaluations and the weightings with the assistance of the weighting rules; and
output mechanisms for requesting the user to enter an evaluation and to output values for the weighted evaluations, wherein
a) the storage mechanisms are set up for the storage of:
a1) for a predefinable number of key elements of the system in each instance:
the criticality of the key element in the system, and
the type of methods for status monitoring implemented for this key element and the respective effectiveness and economic viability of said methods, and
a2) a rule for determining the efficiency of the method for status monitoring implemented for a key element from the respective effectiveness and economic viability of the method as well as the criticality of the key element;
b) the input mechanisms are set up to input values for the criticality of a key element in the system and the effectiveness and economic viability of the methods implemented for status monitoring;

c) the processing mechanisms are set up to determine the respective efficiency of the method from the respectively input values for the effectiveness and economic viability and the criticality of the key element with the assistance of the rule for determining the efficiency; and d) the output mechanisms are set up to request a user to input the values for the criticality of the key element, the effectiveness and economic viability of the method for status monitoring as well as to output the values for the efficiency of the method.

18. Computer readable media for storing a computer program configured to formulate potential measures for increasing the reliability of a technical system, the computer readable media comprising:

computer readable code for providing at least one evaluation aid with predefined evaluation criteria, wherein the evaluation criteria serve to evaluate measures of the technical system taking place in the context of predictive maintenance;

computer readable code for requesting a user to specify an evaluation and a weighting respectively for each of the evaluation criteria;

computer readable code for determining and outputting a weighted evaluation from the evaluations and the weightings with the assistance of a predefined weighting rule to identify a list of measures with the most important measures;

computer readable code for selecting at least one key element or key maintenance group of the system;

computer readable code for providing at least one verification aid to verify the results obtained with the at least one evaluation aid; and computer readable code for verifying the result for the at least one selected key element or key maintenance group using the verification aid.

19. Computer readable media for storing a computer program configured to formulate potential measures for increasing the reliability of a technical system, the computer readable media comprising:

computer readable code for providing at least one evaluation aid with predefined evaluation criteria, wherein the evaluation criteria serve to evaluate measures of the technical system taking place in the context of predictive maintenance;

computer readable code for requesting a user to specify an evaluation and a weighting respectively for each of the evaluation criteria, wherein the evaluation criteria are assigned to predefined evaluation groups; and computer readable code for determining and outputting a weighted evaluation from the evaluations and the weightings with the assistance of a predefined weighting rule to identify a list of measures with the most important measures, and further wherein the evaluation criteria are assigned respectively to evaluation subgroups and a weighted evaluation of the associated evaluation subgroup is determined from the evaluations and weightings of individual evaluation criteria of an evaluation subgroup.

* * * * *